United States Patent
Miura

(10) Patent No.: US 6,769,944 B2
(45) Date of Patent: Aug. 3, 2004

(54) EXHAUST AND DRAIN STRUCTURE FOR VESSELS

(75) Inventor: Takayoshi Miura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/309,011

(22) Filed: Dec. 4, 2002

(65) Prior Publication Data

US 2003/0129891 A1 Jul. 10, 2003

(30) Foreign Application Priority Data

Dec. 10, 2001 (JP) ........................................ 2001-376253

(51) Int. Cl.[7] .............................................. B63H 21/38
(52) U.S. Cl. .................. 440/89 B; 440/89 C; 440/89 F
(58) Field of Search ............... 440/88 G, 88 J, 440/89 R, 89 B, 89 C, 89 E, 89 J, 89 F

(56) References Cited

U.S. PATENT DOCUMENTS 5,846,102 A * 12/1998 Nitta et al. .................... 440/1

6,213,827 B1 * 4/2001 Hattori et al. ............ 440/89 R

FOREIGN PATENT DOCUMENTS

| JP | 08-053098 A | | 2/1996 |
| JP | 10-212936 | * | 8/1998 |

* cited by examiner

*Primary Examiner*—Sherman Basinger
(74) *Attorney, Agent, or Firm*—Birch, Stewart, Kolasch & Birch, LLP

(57) ABSTRACT

To effectively cool a water muffler. Exhaust gas from an engine is discharged through an exhaust pipe having a water jacket into a water muffler together with water passed through the water jacket. A water outlet port of the exhaust pipe is directed toward an upper portion of the inner wall surface of the water muffler on which exhaust gas discharged from the exhaust pipe. An exhaust exit is directly directed toward the inner surface of the case of the water muffler and the water outlet port is directed toward the upper portion of the portion on which exhaust gas is directly blown.

17 Claims, 5 Drawing Sheets

EXHAUST AND DRAIN STRUCTURE FOR VESSELS

CROSS-REFERENCE TO RELATED APPLICATIONS

The present nonprovisional application claims priority under 35 USC 119 to Japanese Patent Application No. 2001-376253 filed on Dec. 10, 2001 the entire contents thereof is hereby incorporated by reference.

BACKGROUND OF THE INVENTION

1. Field of the Invention

The present invention relates to an exhaust and drain structure for vessels, and more specifically, to an exhaust and drain structure for discharging exhaust gas from an engine mounted on a vessel through an exhaust pipe having a water jacket and into a water muffler together with water passed through the water jacket.

2. Description of Background Art

Hitherto fore, an exhaust and drain structure for vessels is known as shown in FIG. 5 and as disclosed in Japanese Patent No. 2,770,135.

The exhaust and drain structure is adapted to discharge exhaust gas from an engine 1 mounted on a vessel through an exhaust pipe 2 having a water jacket 2a into a water muffler 3 together with water passed through the water jacket 2a.

The interior of the water muffler 3 is divided into a first chamber 3c, a second chamber 3d, and a third chamber 3e by partition plates 3a, 3b. The exhaust pipe 2 is connected to the first chamber 3c. A first communication pipe 3f is provided between the first chamber 3c and the second chamber 3d for bringing the chambers into communication with each other. A second communication pipe 3g is provided for bringing the second chamber 3d and the third chamber 3e into communication with each other. An exhaust and drain pipe 4 is connected to the third chamber 3e.

Therefore, exhaust gas and water discharged from the exhaust pipe 2 into the first chamber 3c in the water muffler 3 passes through the first chamber 3c and the first communication pipe 3f and flows into the second chamber 3d, then flows from the second chamber 3d through the second communication pipe 3g into the third chamber 3e, and then is discharged from the third chamber 3e through the exhaust and drain pipe 4 toward the outside of the vessel.

In the aforementioned exhaust and drain structure in the related art, both an exhaust exit 2b and a water outlet port 2c of the exhaust pipe 2 are directed toward the partition plate 3a of the water jacket 3 and are substantially parallel with each other. Therefore, exhaust gas at high temperature from the exhaust exit 2b is directly blown onto the partition plate 3a, whereby the temperature of the portion 3a1 of the partition plate 3a on which exhaust gas is blown rises. However, this portion 3a1 also receives water discharged from the outlet port 2c. Thus, the increase in temperature is suppressed to some extent.

However, in this related art, since the portion 3a1 on which a high temperature exhaust gas is blown and the portion 3a1 on which water is discharged are substantially the same and thus located at the same height, the portion 3a1 on which exhaust gas is blown is not necessarily cooled effectively. As a consequent, there arises a problem in that the temperature of the water muffler tends to increase.

SUMMARY AND OBJECTS OF THE INVENTION

It is an object of the present invention to provide an exhaust and drain structure for vessels in which the problem as described above is solved and thus the water muffler may be cooled effectively.

In order to achieve the object described above, an exhaust and drain structure for vessels according to the present invention is an exhaust and drain structure for discharging exhaust gas from an engine through an exhaust pipe having a water jacket into a water muffler together with water passed through the water jacket wherein a water outlet port of the aforementioned exhaust pipe is directed toward the upper portion of the inner wall surface of the water muffler on which exhaust gas discharged from the exhaust pipe is directly blown.

An exhaust and drain structure for vessels according to the present invention includes an exhaust and drain structure for discharging exhaust gas from an engine through an exhaust pipe having a water jacket into a water muffler together with water passed through the water jacket wherein an exhaust exit of the aforementioned exhaust pipe is directed directly toward the side surface in the case of the water muffler, and a water outlet port of the aforementioned exhaust pipe is directed directly toward the side surface in the aforementioned case and directed toward the portion upwardly of the portion on which exhaust gas discharged from the aforementioned exhaust pipe is directly blown.

The exhaust and drain structure for vessels according to the present invention is an exhaust and drain structure for discharging exhaust gas from an engine through the exhaust pipe having a water jacket into the water muffler together with water passed through the water jacket, wherein the water outlet port of the aforementioned exhaust pipe is directed toward the upper portion of the inner wall surface of the water muffler on which exhaust gas discharged from the exhaust pipe is directly blown. Therefore, according to this exhaust and drain structure for vessels, the following effects are achieved.

In other words, since the portion of the inner wall surface of the water muffler on which water is discharged is located upwardly of the portion on which exhaust gas is blown, water discharged on the portion on which water is discharged cools the aforementioned portion on which exhaust gas is blown effectively in the process of falling along the inner wall surface.

Therefore, with the exhaust and drain structure for vessels according to the present invention, the portion on which exhaust gas is blown is effectively cooled, and consequently, the water muffler is effectively cooled.

The exhaust and drain structure for vessels according to the present invention is an exhaust and drain structure for discharging exhaust gas from the engine through an exhaust pipe having a water jacket wherein a water muffler together with water passed through the water jacket is provided. The exhaust exit of the aforementioned exhaust pipe is directed directly toward the side surface in the case of the water muffler, and the water outlet port of the aforementioned exhaust pipe is directed directly toward the side surface in the aforementioned case. Therefore, the passage for exhaust and water in the water muffler may be elongated.

When the exhaust exit is directed directly toward the inner surface of the case of the water muffler, the temperature of the case of the water muffler increases. However, according to the structure as set forth in the present invention, the water outlet port in the exhaust pipe is directed directly toward the inner surface of the case, and directed toward the portion upwardly of the portion on which exhaust gas discharged from the aforementioned exhaust pipe is directly blown. Therefore, the portion of the inner surface in the case of the water muffler on which water is discharged is located upwardly of the portion on which exhaust gas is blown. Thus, water discharged on the portion on which water is discharged cools the aforementioned portion on which exhaust gas is blown effectively in the process of falling along the inner surface of the case.

Therefore, with the exhaust and drain structure for vessels according to the present invention, the passage of exhaust gas and water in the water muffler may be elongated, and simultaneously, the portion on which exhaust gas is blown may be cooled effectively though the exhaust exit of the exhaust pipe is directed directly toward the inner surface of the case of the water muffler. As a consequent, the water muffler is effectively cooled.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
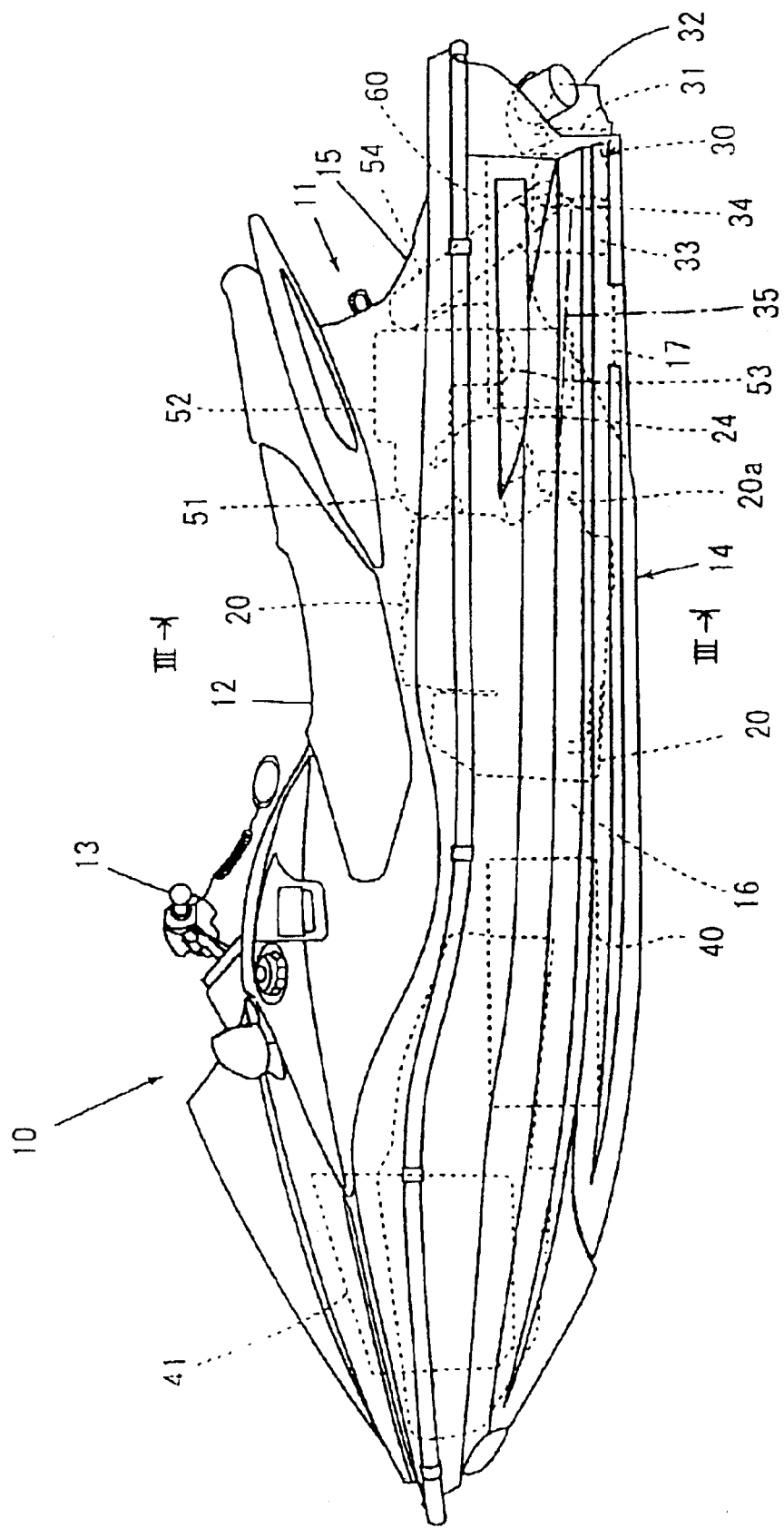
FIG. 1 is a general side view showing an example of the small planing boat employing an embodiment of the exhaust and drain structure for vessels according to the present invention.

Referring now to the drawings, an embodiment of the present invention will be described.

Figure 2:
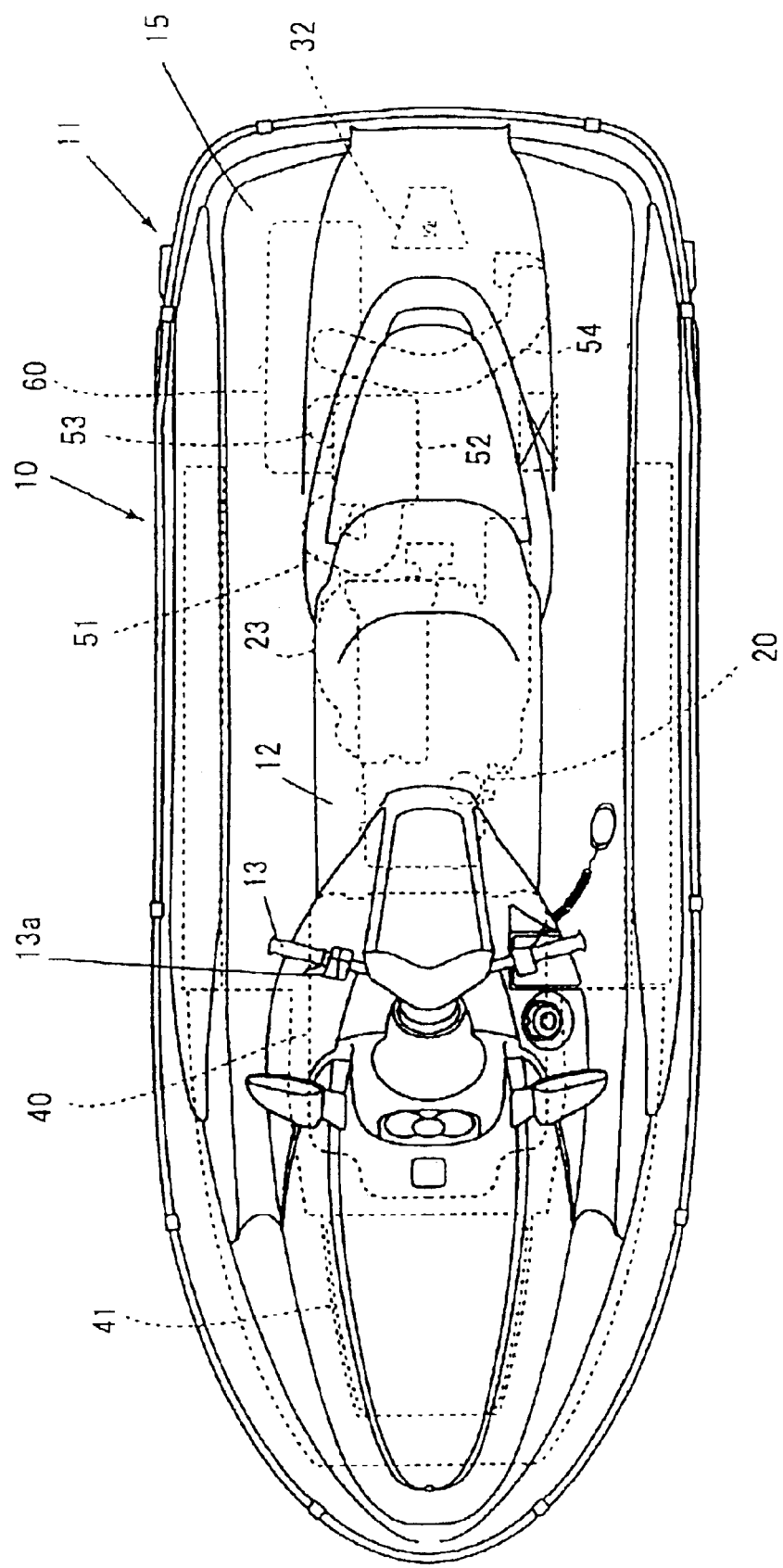
FIG. 2 is a plan view of the same.

As shown in FIGS. 1 and 2, a small planing boat 10 is a saddle riding type small vessel, in which an occupant sits on a seat 12 on a vessel body 11 and operates the vessel by gripping a steering handle 13 with a throttle lever.

The vessel body 11 has a floating structure formed with a space 16 provided inside by joining a hull 14 and a deck 15. In the space 16, an engine 20 is mounted on the hull 14, and a jet pump (jet propulsion pump) 30 as a propelling means to be driven by the engine 20 is provided on the rear portion of the hull 14.

The jet pump 30 includes a flow path 33 extending from a water intake 17 opening on the bottom of the vessel to a jet port 31 opening at the rear end of the vessel body. A nozzle 32 is provided with an impeller 34 disposed in the flow path 33 wherein a shaft 35 of the impeller 34 is connected to an output shaft 20a of the engine 20. Therefore, when the impeller 34 is rotated by the engine 20, water taken through the water intake 17 is emitted from the jet port 31 through the nozzle 32 thereby propelling the vessel body 11. The revolution of the engine 20, that is, a propulsion force generated by the jet pump 30, is controlled by rotating a throttle lever 13a (See FIG. 2) of the aforementioned steering handle 13. The nozzle 32 is linked with the steering handle 13 with an operating wire, not shown, and is rotated by the operation of the handle 13, thereby being able to change the course.

A fuel tank 40 is provided adjacent to a storing chamber 41.

Figure 3:
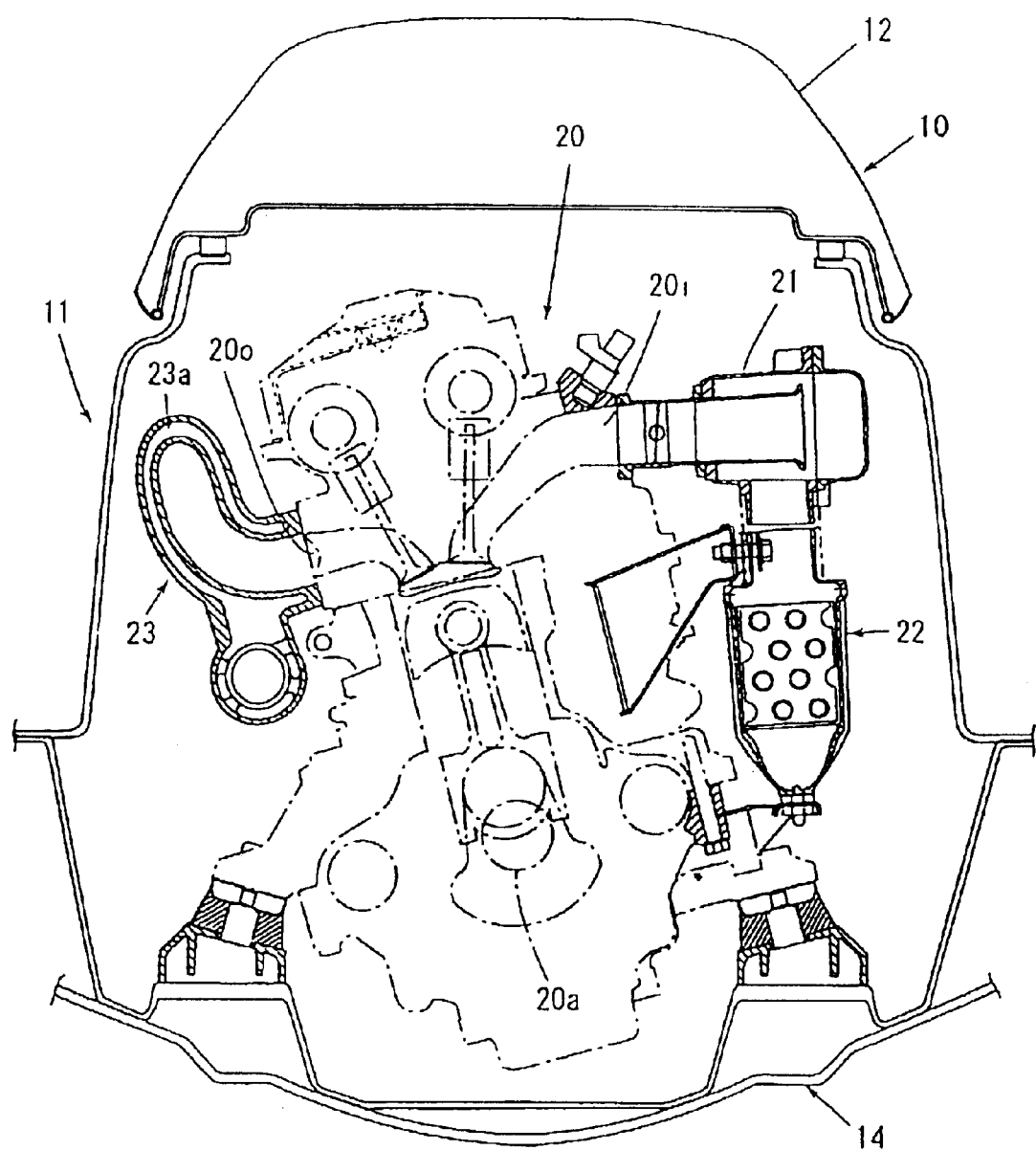
FIG. 3 shows mainly the engine 20, and is a partially enlarged cross-sectional view (partially omitted cross-sectional view) taken along the line III-III in FIG. 1.

FIG. 3 shows mainly the engine 20, and is a partially enlarged cross-sectional view (partially omitted cross-sectional view) taken along the line III-III in FIG. 1.

The engine 20 is a DOHC type, in-line, four-cylinder, dry sump, four-cycle engine, and as shown in FIG. 1, the crankshaft 20a is disposed so as to extend along the length of the vessel body 11.

As shown in FIG. 3, a surge tank (intake chamber) 21 in communication with an intake port 20i together with an intercooler 22 are disposed on the left side of the engine 20 when viewed toward the traveling direction of the vessel body 11, and an exhaust manifold 23 in communication with an exhaust port 20o is disposed in connection on the right side of the engine 20.

As shown in FIG. 1, a turbocharger (supercharger) 24 is disposed rearwardly of the engine 20, and the exhaust exit of the exhaust manifold 23 is connected to the turbine unit of the turbocharger 24. The aforementioned intercooler 22 is connected to the compressor unit of the turbocharger 24.

Exhaust gas that rotated the turbine at the turbine unit of the turbocharger 24 is, as shown in FIGS. 1 and 2, and as will be described in detail later, flows through a first exhaust pipe 51, a reverse flow prevention chamber 52, for preventing reverse flow of water (entrance of water into the turbocharger 24 or the like) in case of overturn, and a second exhaust pipe 53, and is discharged into the water muffler 60, and subsequently discharged from the water muffler 60 into the water flow from the jet pump 30 through the exhaust and drain pipe 54.

Figure 4:
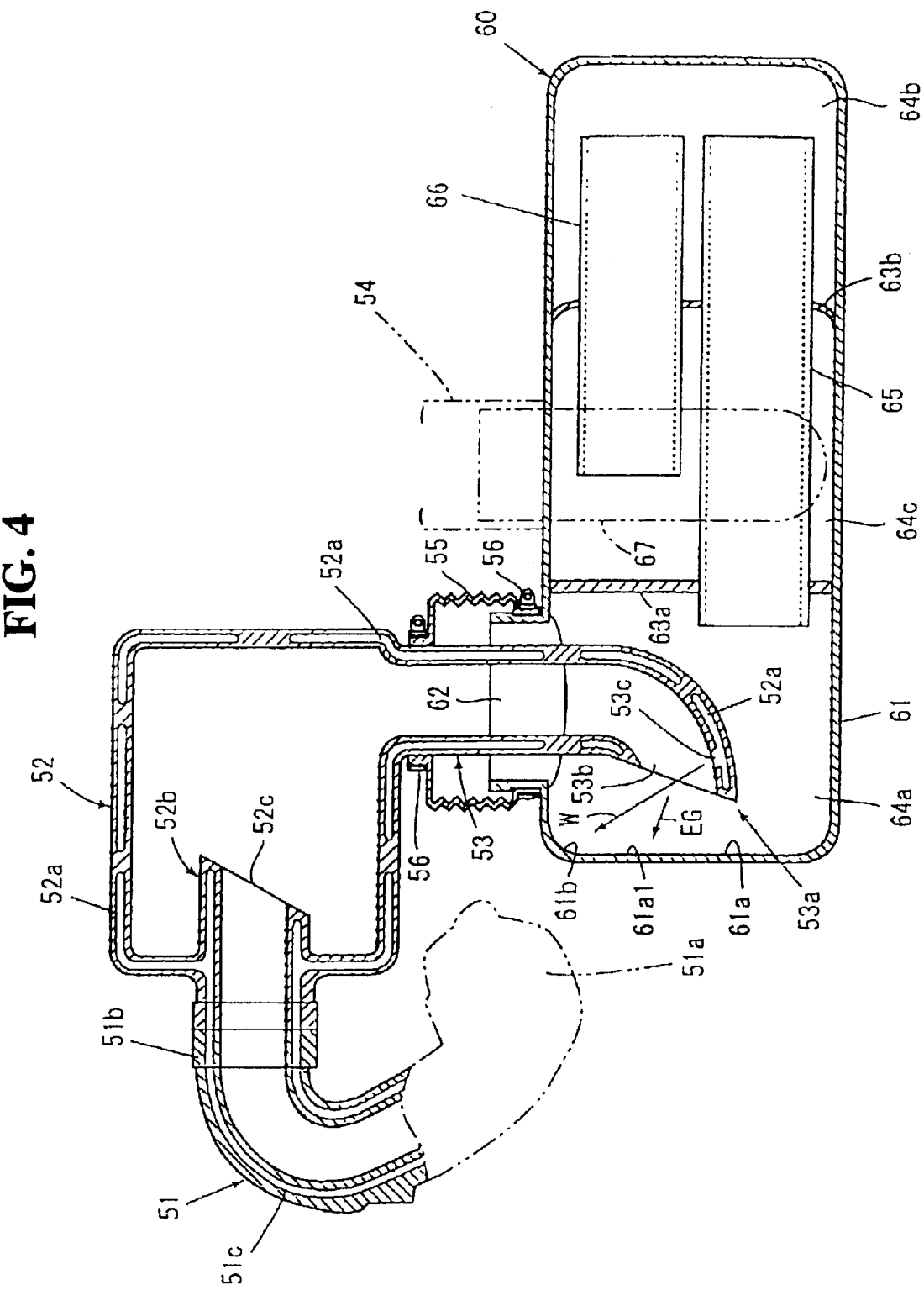
FIG. 4 is the partially omitted cross-sectional view showing the first exhaust pipe 51, the reverse flow prevention chamber 52, the second exhaust pipe 53, the water muffler 60, and the exhaust and drain pipe 54.
Figure 5:
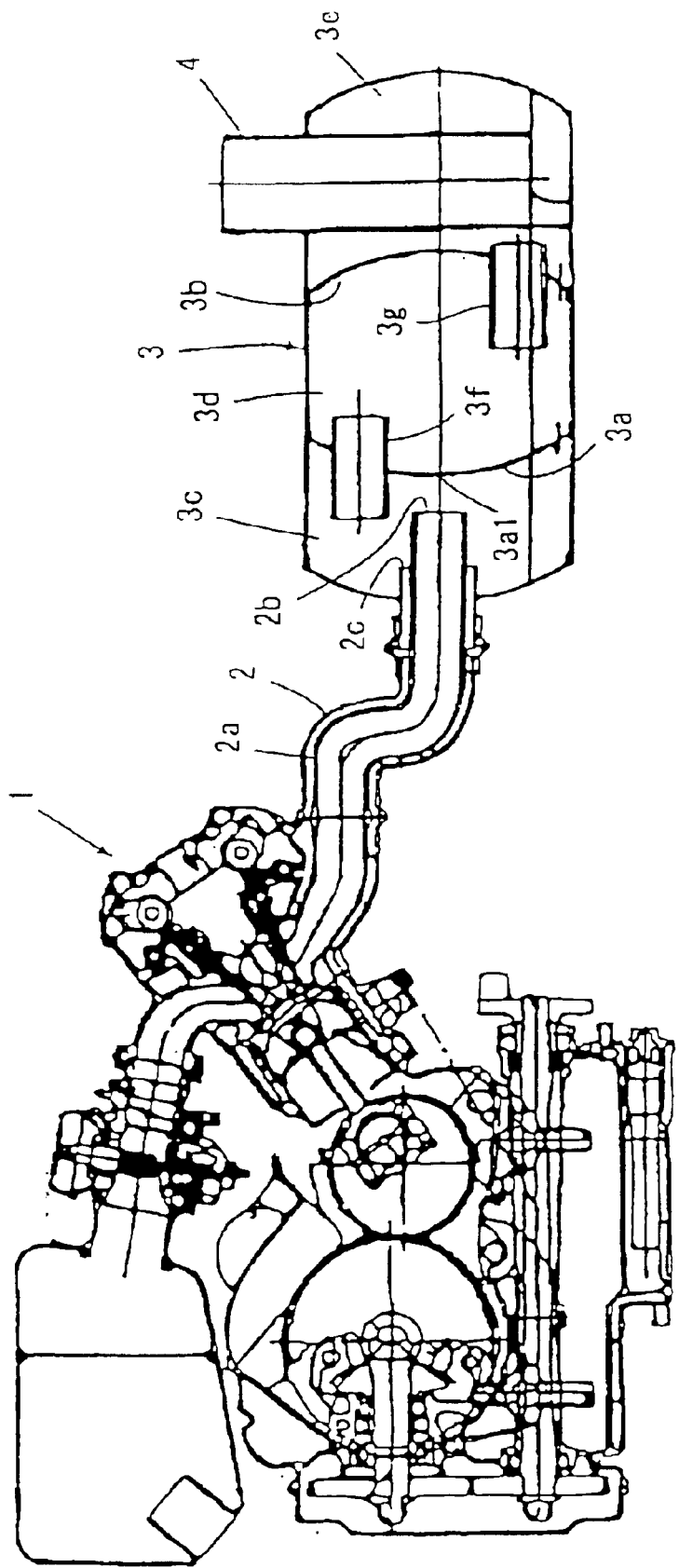
FIG. 5 is an explanatory drawing of the related art.

FIG. 4 is the partially omitted cross-sectional view showing the first exhaust pipe 51, the reverse flow prevention chamber 52, the second exhaust pipe 53, the water muffler 60, and the exhaust and drain pipe 54.

One end 51a of the first exhaust pipe 51 is connected to the turbine unit of the aforementioned turbocharger 24, and the other end 51b thereof is connected to the reverse flow prevention chamber 52. The distal end 52c of an exhaust gas introducing pipe 52b inside the reverse flow prevention chamber 52 connected to the first exhaust pipe 51 (exit of exhaust gas toward the inside of the reverse flow prevention chamber 52) is formed to be inclined downwardly.

The reverse flow prevention chamber 52 and the second exhaust pipe 53 are formed integrally, and the distal end 53a of the second exhaust pipe 53 is inserted into the water muffler 60. An insertion port 62 for the second exhaust pipe 53 is formed on the case 61 of the water muffler 60. The second exhaust pipe 53 and the water muffler 60 are connected by inserting the distal end 53a of the second exhaust pipe 53 into the insertion port 62, and then connecting the insertion port 62 and the upper portion of the second exhaust pipe 53 with an accordion-folded connecting member 55. Ring-shaped tightening members 56, 56 are provided for tightening the ends of the connecting member 55 on the insertion port 62 and the upper portion of the second exhaust pipe 53, respectively.

The reverse flow prevention chamber 52 and the second exhaust pipe 53 are provided with a water jacket 52a. The water jacket 52a is in communication with a water jacket 51c of the first exhaust pipe 51.

A cooling water outlet port (not shown) is provided on the aforementioned jet pump 30 on the upstream side of the impeller 34. Cooling water is supplied to the water jacket of the objects to be cooled (engine 20, intercooler 22, or the like) through the cooling water feed pipe (not shown) connected to the outlet port.

In this embodiment, cooling water fed to a water jacket 23a of the exhaust manifold 23 (See FIG. 3) and then to the water jacket of the turbocharger 24 (not shown) is fed to the water jacket 51c of the aforementioned first exhaust pipe 51 and the water jacket 52a of the reverse flow prevention chamber 52 and the second exhaust pipe 53, and then discharged from the distal end 53a in the second exhaust pipe 53 into the water muffler 60.

Therefore, exhaust gas from the engine 20 is discharged through the exhaust pipe having the water jacket (in this embodiment, the exhaust manifold 23, the turbocharger 24, the first exhaust pipe 51, the reverse flow prevention chamber 52, and the second exhaust pipe 53) into the water muffler 60 together with water passed through the water jacket.

The distal end 53a of the second exhaust pipe 53 is formed into a curved shape, and an exhaust exit 53b is slightly inclined upwardly. Therefore, exhaust gas discharged from the exhaust exit 53b is directed slightly upwardly as indicated by the arrow EG (in the direction away from a first communication pipe 65 that will be described later), and directly blown onto the inner wall surface of the water muffler 60 (in this case, the inner surface of the case 61).

On the other hand, a water (cooling water) outlet port 53c in communication with the water jacket 52a is provided at the distal end 53a of the second exhaust pipe 53, and the outlet port 53c is directed toward the upper portion 61b of an inner wall surface 61a of the water muffler 60 on which the aforementioned exhaust gas GE is directly blown. Therefore, water from the outlet port 53c is discharged toward the upper portion 61b of the inner wall surface 61a of the water muffler 60 as indicated by the arrow W.

In other words, in the exhaust and drain structure of this embodiment, the exhaust exit 53b of the exhaust pipe 53 is directed directly toward the inner surface 61a of the case of the water muffler 60, and the water outlet port 53c in the exhaust pipe 53 is directed directly toward the inner surface of the case 61a, and toward the upper portion 61b of the portion 61a on which the exhaust gas EG discharged from the exhaust pipe 53 is directly blown.

The interior of the water muffler 60 is divided into a first chamber 64a, a second chamber 64b, and a third chamber 64c by partition plates 63a, 63b, and the aforementioned second exhaust pipe 53 is connected to the first chamber 64a. In this embodiment, the third chamber 64c is disposed between the first chamber 64a and the second chamber 64b. The first communication pipe 65 is provided between the first chamber 64a and the second chamber 64b and is in communication with the first chamber 64a and the second chamber 64b through the third chamber 64c. A second communication pipe 66 is provided between the second chamber 64b and the third chamber 64c and is in communication with these chambers. An exhaust and drain pipe 67 is provided in the third chamber 64c and the aforementioned exhaust and drain pipe 54 (See FIGS. 1 and 2) is connected to the exhaust and drain pipe 67.

Therefore, exhaust gas and water discharged from the second exhaust pipe 53 into the first chamber 64a in the water muffler 60 enter through the first chamber 64a and the first communication pipe 65 into the second chamber 64b, and enter from the second chamber 64b through the second communication pipe 66 into the third chamber 64c, and then are discharged out of the ship from the third chamber 64c through the exhaust and drain pipes 67 and 54.

With the exhaust and drain structure as described above, the following effects are achieved.

Since it is an exhaust and drain structure for discharging exhaust gas EG from the engine 20 though the exhaust pipe 53 having the water jacket into the water muffler 60 together with water W passed through the water jacket 52a, wherein the water outlet port 53c of the exhaust pipe 53 is directed toward the upper portion 61b of the inner wall surface 61a of the water muffler 60 on which exhaust gas EG discharged form the exhaust pipe 53 is directly blown, the portion 61b on which water W is discharged is positioned upwardly of the portion 61a1 of the inner wall surface 61a of the water muffler 60 on which exhaust gas EG is blown.

Therefore, water discharged on the portion 61b on which water W is discharged cools the aforementioned portion 61a1 on which the exhaust gas EG is blowing effectively in the process of falling along the inner wall surface 61a, and as a consequent, the water muffler 60 is effectively cooled.

Such effect (a) may be obtained in the case where the portion on which the exhaust gas and water are blown is not the inner surface 61a of the case 61 of the water muffler 60 (for example, in the case in which exhaust gas and water are blown on the partition plate 63a) as well.

(b) Since the exhaust exit 53b of the exhaust pipe 53 is directly directed toward the inner surface 61a of the case 61 of the water muffler 60, and the water outlet port 53c of the exhaust pipe 53 is directly directed toward the inner surface 61a of the case, the passage for exhaust gas and water in the water muffler 60 may be elongated. For example, in FIG. 4, the passage for exhaust gas and water in the water muffler 60 may be made longer than the case in which the exhaust exit 53b and the water outlet port 53c of the exhaust pipe 53 are directed toward the partition plate 63a. Therefore, exhaust noise may be reduced and the exhaust temperature may also be lowered.

When directing the exhaust exit 53b directly toward the inner surface 61a of the case of the water muffler 60, the temperature of the case 61 of the water muffler, especially of the portion 61a1 on which exhaust gas is directly blown is going to increase. However, with the structure according to the present embodiment, since the water outlet port 53c of the exhaust pipe 53 is directly directed toward the inner surface 61a of the case, and toward the upper portion 61b of the portion 61a1 on which exhaust gas discharged form the exhaust pipe 63 is directly blown, the portion 61b of the inner surface 61a of the case of the water muffler 60 on which water is discharged is located upwardly of the portion 61a1 of the inner surface 61a of the case of the water muffler 60 on which exhaust gas is blown. Therefore, water discharged on the portion 61b on which the water is discharged cools the aforementioned portion 61a1 on which exhaust gas is blown effectively in the process of falling along the inner surface 61a of the case.

Accordingly, in this exhaust and drain structure, the passage of exhaust gas and water in the water muffler 60 may be elongated, and simultaneously, the portion 61a1 on which exhaust gas is blown may be cooled effectively even though the exhaust exit 63b of the exhaust pipe 63 is directed directly toward the inner surface 61a of the case of the water muffler 60. As a consequence, the water muffler 60 is effectively cooled.

(c) Since this type of small planing boat is mainly used for leisure, the boat may overturn. Therefore, in case of overturning, water stored at the bottom in the water muffler 60 may enter from the exhaust exit of the second exhaust pipe 53, backflow through the reverse flow prevention chamber 52 and the first exhaust pipe 51, and reach the turbocharger 24 or the exhaust manifold 23 or the like. Consequently, the turbocharger 24 or the exhaust manifold 23 that are heated to a high temperature may be very suddenly cooled, thereby increasing thermal fatigue.

In contrast thereto, according to the present embodiment, since the distal end 53a of the second exhaust pipe 53 inserted into the water muffler 60 is formed in a curved shape, and simultaneously the exhaust exit 53b is slightly inclined upwardly, even when the small planing boat 11 is overturned (in the state in which FIG. 4 is inverted), the distal end 53a of the second exhaust pipe 53 takes a posture similar to an appentice, and the exhaust exit 53b is slightly inclined downwardly.

Therefore, the event wherein water stored at the bottom in the water muffler 60 enters through the exhaust exit 53b of the second exhaust pipe 53 may rarely occur even when the boat is overturned. Given that a small amount of water enters therein, the water stays in the reverse flow prevention chamber 52, and thus the event in which it enters into the first exhaust pipe 51 may rarely occur.

Furthermore, since the distal end (exhaust exit leading to the reverse flow prevention chamber 52) 52c of the exhaust gas introducing pipe 52b in the reverse flow prevention chamber 52 is formed in the state of being inclined downwardly, when the overturned small planing boat 10 is restored to its original posture, the distal end 52c of the exhaust gas introducing pipe 52b in turn takes a posture similar to an appentice, and thus the event in which water in the reverse flow prevention chamber 52 enters into the exhaust gas introducing pipe 52b may rarely occur.

Therefore, according to this embodiment, even when the small planing boat 10 is overturned and restored into its original posture, the event in which water in the water muffler 60 backflows toward the turbocharger 24, the exhaust manifold 23, or the like may rarely occur, and consequently, the durability of the turbocharger 24 and the exhaust manifold 23 against thermal fatigue is improved. Especially, damage on the turbine blade of the turbocharger 24 at high temperature may reliably be prevented.

Though the embodiments of the present invention have been described thus far, the present invention is not limited thereto, but modification may be made as appropriate within the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust and drain structure for vessels for discharging exhaust gas from an engine through an exhaust pipe having a water jacket into a water muffler together with water passed through the water jacket, comprising:

a water outlet port of said exhaust pipe, said water outlet port being directed toward an upper portion of an inner wall surface of the water muffler on which exhaust gas discharged from the exhaust pipe is directly blown;

wherein said exhaust pipe includes a distal end projecting a predetermined distance adjacent to said inner wall of the water muffler, said water outlet port being formed in the distal end of the exhaust pipe and opening upwardly for providing water from the water jacket to be sprayed to the upper portion of the inner wall surface of the water muffler to flow downwardly therefrom for cooling said water muffler.

2. The exhaust and drain structure for vessels for discharging exhaust gas according to claim 1, wherein said water muffler includes a first chamber for directly receiving exhaust gas and water, a second chamber displaced a predetermined distance relative to said first chamber and a third chamber being disposed therebetween.

3. The exhaust and drain structure for vessels for discharging exhaust gas according to claim 2, and further including a first communication conduit for connecting the first chamber and the second chamber and a second communication conduit for connecting the second chamber and the third chamber.

4. The exhaust and drain structure for vessels for discharging exhaust gas according to claim 1, wherein said distal end of the exhaust pipe is curved to be slightly inclined upwardly for directing the spray of water to the upper portion of the inner wall surface while permitting the exhaust gas to be directly discharged onto the inner wall surface.

5. The exhaust and drain structure for vessels for discharging exhaust gas according to claim 1, and further including a reverse flow prevention chamber being connected to said exhaust pipe for temporarily preventing a flow of water into said water muffler when the vessel is overturned.

6. The exhaust and drain structure for vessels for discharging exhaust gas according to claim 5, wherein said reverse flow prevention chamber and said exhaust pipe are integral relative to each other.

7. The exhaust and drain structure for vessels for discharging exhaust gas according to claim 5, and further including a connecting member operatively connected between the exhaust pipe and the water muffler for providing a fluid tight connection therebetween.

8. The exhaust and drain structure for vessels for discharging exhaust gas according to claim 1, wherein a flow path of the exhaust gas through said water muffler is increased in length by directing the exhaust gas onto the inner wall surface of the water muffler and causing said exhaust gas to travel through a first chamber, a second chamber and a third chamber prior to being discharged from the water muffler.

9. An exhaust and drain structure for discharging exhaust gas from an engine comprising:

an exhaust pipe having a water jacket disposed thereon, said exhaust pipe exhausting gas into a water muffler together with water passed through the water jacket;

a first chamber being disposed within said water muffler, said first chamber being formed by a partition plate disposed within said water muffler and including a first wall surface being displaced a predetermined distance relative to said partition plate;

a water outlet port of said exhaust pipe, said water outlet port being directed toward an upper portion of the first wall surface of the water muffler on which exhaust gas discharged from the exhaust pipe is directly blown;

wherein said exhaust pipe includes a distal end projecting a predetermined distance adjacent to said first wall of the water muffler, said water outlet port being formed in the distal end of the exhaust pipe and opening upwardly for providing water from the water jacket to be sprayed to the upper portion of the first wall surface of the water muffler to flow downwardly therefrom for cooling said water muffler.

10. The exhaust and drain structure for discharging exhaust gas according to claim 9, wherein said water muffler includes a second chamber displaced a predetermined distance relative to said first chamber and a third chamber being disposed therebetween.

11. The exhaust and drain structure for discharging exhaust gas according to claim 10, and further including a first communication conduit for connecting the first chamber and the second chamber and a second communication conduit for connecting the second chamber and the third chamber.

12. The exhaust and drain structure for discharging exhaust gas according to claim 9, wherein said distal end of the exhaust pipe is curved to be slightly inclined upwardly for directing the spray of water to the upper portion of the first wall surface while permitting the exhaust gas to be directly discharged onto the first wall surface.

13. The exhaust and drain structure for discharging exhaust gas according to claim 9, and further including a reverse flow prevention chamber being connected to said exhaust pipe for temporarily preventing a flow of water into said water muffler.

14. The exhaust and drain structure for discharging exhaust gas according to claim 13, wherein said reverse flow prevention chamber and said exhaust pipe are integral relative to each other.

15. The exhaust and drain structure for discharging exhaust gas according to claim 13, and further including a connecting member operatively connected between the exhaust pipe and the water muffler for providing a fluid tight connection therebetween.

16. The exhaust and drain structure for discharging exhaust gas according to claim 9, wherein a flow path of the exhaust gas through said water muffler is increased in length by directing the exhaust gas onto the first wall surface of the water muffler and causing said exhaust gas to travel through the first chamber, a second chamber and a third chamber prior to being discharged from the water muffler.

17. An exhaust and drain structure for discharging exhaust gas from an engine through an exhaust pipe having a water jacket into a water muffler together with water passed through the water jacket, comprising:
 an exhaust exit of said exhaust pipe is directed directly toward a side surface in a case of the water muffler; and
 a water outlet port of said exhaust pipe is directed directly toward the side surface in said case and toward a portion upwardly of the portion on which exhaust gas discharged from said exhaust pipe is directly blown;
 wherein said exhaust pipe includes a distal end projecting a predetermined distance adjacent to said side surface of the case, said water outlet port being formed in the distal end of the exhaust pipe and opening upwardly for providing water from the water jacket to be sprayed to the upper portion of the side surface of the case to flow downwardly therefrom for cooling said water muffler.

* * * * *